United States Patent
Curran et al.

(10) Patent No.: US 10,461,452 B2
(45) Date of Patent: Oct. 29, 2019

(54) PROCESS FOR MAKING CORROSION-RESISTANT ELECTRICAL CONTACTS IN A WIDE RANGE OF COLORS

(71) Applicant: Apple Inc., Cupertino, CA (US)

(72) Inventors: James A. Curran, Morgan Hill, CA (US); Daniel T. McDonald, San Jose, CA (US)

(73) Assignee: Apple Inc., Cupertino, CA (US)

( * ) Notice: Subject to any disclaimer, the term of this patent is extended or adjusted under 35 U.S.C. 154(b) by 378 days.

(21) Appl. No.: 15/247,783

(22) Filed: Aug. 25, 2016

(65) Prior Publication Data

US 2018/0062294 A1    Mar. 1, 2018

(51) Int. Cl.
| | |
|---|---|
| *H01R 13/03* | (2006.01) |
| *H01R 13/24* | (2006.01) |
| *H01R 12/71* | (2011.01) |
| *H01R 43/16* | (2006.01) |
| *G06F 1/16* | (2006.01) |

(52) U.S. Cl.
CPC ......... *H01R 13/03* (2013.01); *G06F 1/1633* (2013.01); *G06F 1/1656* (2013.01)

(58) Field of Classification Search
CPC ...... H01R 13/03; G06F 1/1633; G06F 1/1656
See application file for complete search history.

(56) References Cited

U.S. PATENT DOCUMENTS

| | | | | |
|---|---|---|---|---|
| 4,066,816 | A | * | 1/1978 | Sheasby .......... C25D 11/12 428/336 |
| 4,310,586 | A | * | 1/1982 | Sheasby .......... C25D 11/12 205/105 |

* cited by examiner

*Primary Examiner* — Timothy J Thompson
*Assistant Examiner* — Amol H Patel
(74) *Attorney, Agent, or Firm* — Kilpatrick Townsend and Stockton, LLP (57) ABSTRACT

Techniques for forming a metal oxide from a metal substrate are disclosed. In some embodiments, the metal oxide can have an optical path difference between about 300 nm to about 1000 nm. The variations in optical path difference can impart the metal oxide to correspond to a range of predefined colors. In some embodiments, the optical path difference can impart the metal oxide to have an oxide color that is substantially similar to a color of a housing of a portable electronic device. In some embodiments, the metal oxide can be electrically conductive and the metal oxide can be utilized as an electrical contact of an electronic device to transmit and receive power and data from another electronic device.

21 Claims, 9 Drawing Sheets

| Chromium Oxide Thickness (t) | a* | b* |
|---|---|---|
| 60 nm | -11 | 37 |
| 80 nm | 17 | 59 |
| 100 nm | 62 | -31 |
| 140 nm | 33 | -81 |

*FIG. 8B*

PROCESS FOR MAKING CORROSION-RESISTANT ELECTRICAL CONTACTS IN A WIDE RANGE OF COLORS

FIELD

The described embodiments relate to metal oxide layers for use as an electrical contact and methods for forming an electrical contact having a metal oxide layer.

BACKGROUND

Portable electronic devices can include exposed electrical contacts to facilitate power and data transfer between different electronic devices. In addition to the electrical contacts being conductive, there is also a need for the electrical contacts to be both abrasion resistant and corrosion resistant in order to withstand daily usage. While conventional portable electronic devices can utilize electrical contacts manufactured from metals such as gold, aluminum, and copper, these are relatively soft metals and fail to provide sufficient abrasion resistance in daily use. Moreover, yielding a wide range of colors is beyond the scope of these metals. Accordingly, there is a demand for electronic devices to include electrical contacts made of a material that can conduct electricity, is abrasion resistant and corrosion resistant, and can be developed to yield a wide range of colors to match more of the varied colors of today's electronic devices.

SUMMARY

This paper describes various embodiments related to metal oxide parts having a wide range of colors and methods for forming metal oxide parts having the wide range of colors.

According to one embodiment, an electronic device can include a housing that is characterized by a color and an electrical contact having an upper surface that is visible at an exterior surface of the housing. The electrical contact can include a metal substrate and an electrically conductive metal oxide that corresponds to the color of the housing corresponding to an optical path difference between the upper surface and an interface between the electrically conductive metal oxide and the metal substrate.

According to another embodiment, a method for forming an electrically conductive metal oxide for a component of a portable electronic device, where the portable electronic device can include an enclosure that is characterized by a color and is capable of carrying the component having a metal substrate is described. The method involves forming an electrically conductive metal oxide on the metal substrate, where the electrically conductive metal oxide includes a first reflective surface that corresponds to an upper surface of the electrically conductive metal oxide and a second reflective surface that corresponds to an interface of the metal substrate and the electrically conductive metal oxide. The electrically conductive metal oxide can be characterized as having an optical path difference between the first and the second reflective surfaces that corresponds to the color of the enclosure.

According to another embodiment, a protective coating of a metal substrate can include an electrically conductive metal oxide layer formed on the metal substrate and having an upper surface. The electrically conductive metal oxide layer corresponds to a pre-determined color corresponding to an optical path difference between the upper surface and an interface between the electrically conductive metal oxide layer and the metal substrate.

The described embodiments may be better understood by reference to the following description and the accompanying drawings. Additionally, advantages of the described embodiments may be better understood by reference to the following description and accompanying drawings.

BRIEF DESCRIPTION OF THE DRAWINGS

The included drawings are for illustrative purposes and serve only to provide examples of possible structures and arrangements for the disclosed inventive apparatuses and methods for their application to computing devices. These drawings in no way limit any changes in form and detail that can be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

The following disclosure describes various embodiments of a metal oxide layer and methods for forming a metal oxide layer on a metal substrate. Certain details are set forth in the following description and figures to provide a thorough understanding of various embodiments of the present technology. Moreover, various features, structures, and/or characteristics of the present technology can be combined in other suitable structures and environments. In other instances, well-known structures, materials, operations, and/or systems are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth.

Exposed electrical contacts are increasingly important to the design of aluminum enclosures of consumer electronic devices such as smartphones, smart watches, and tablets where peripheral accessories are to be connected. Although wireless connectivity options exist for power and data transfer, the simplest, slimmest, lightest, and most efficient connectivity option remains providing a direct electrical contact via two electrically conductive materials. For efficient power transfer, the conductive materials should be of high electrical conductivity and of minimal contact resistance.

Although there are several metals that can satisfy the condition of high conductivity and low contact resistance, many of these select metals are neither sufficiently abrasion resistant nor corrosion resistant. For example, if an enclosure is primarily comprised of aluminum, the enclosure can subsequently be anodized to yield a hard, abrasion resistant surface of sufficient durability and physical robustness for continuous handling. If electrical contacts are incorporated into the continuous surface of such an enclosure, the electrical contacts may need to be at least equivalent to the anodized aluminum surface finish in terms of abrasion resistance, corrosion resistance, and general durability. Yet, anodizing an aluminum contact to yield an equivalent surface finish actually renders the aluminum contact electrically insulating. Furthermore, many transition metal oxides can be characterized as insulators.

Among metals, high abrasion resistance is a material property typically achieved by maximizing surface hardness. It should be noted, however, that for an effective electrical contact, it can be desirable for a surface of the electrical contact be softer and/or more compliant to ensure a large area of contact under a given applied pressure. However, this combined need for abrasion resistance and a correspondingly high hardness (greater than ~300 HV-400 HV) in the primary contact surface eliminates many metals, including most aluminum alloys, gold, silver, and copper.

In addition, whenever dissimilar metals are in close proximity to each other, galvanic corrosion can be a potential issue. Many surfaces of consumer electronic devices are exposed to a variety of environmental conditions, which can promote corrosion because of elevated chloride concentrations, low or high pH levels, moisture, humidity, warmth, or temperature cycles. Moreover, any intrinsic sensitivity or vulnerability of the contact material to corrosion will be greatly exacerbated by its function as an electrical contact, which means that the electrical contact can be further expected to face a range of applied potentials of either polarity. In addition, it can be important for the electrical contact to be sufficiently corrosion resistant such as to avoid visible discoloration or tarnish. Accordingly, such requirements can eliminate a wide range of candidate materials such as copper and its alloys. Even with corrosion-protective surface plating layers, such alloys are too vulnerable to corrosion for use in developing electrical contacts for electronic devices.

Furthermore, in some instances, the material selected for the electrical contact can be expected to match the cosmetics (e.g., color, finish) of the bulk of the enclosure of the electronic device. There is an ever-expanding range of colors of electronic devices including the silver color of anodized aluminum, as well as dyed colors of anodized aluminum, and numerous shades of grey, gold, and even rose gold. Very few colors can be achieved in metals through alloying alone: essentially silver, gold, and a very limited range of greys and blacks. While copper can yield a pink or red hue, copper and copper alloys fail to provide sufficient corrosion protection.

In some embodiments, metals such as rhenium, molybdenum, cobalt, and tantalum can be utilized as a material choice for creating the electrical contacts. These metals of rhenium, molybdenum, cobalt, and tantalum are capable of forming hard-oxides. In some embodiments, chromium oxide ($Cr_2O_3$) can provide a material choice for creating electrical contacts having excellent hardness and abrasion resistance, coupled with low contact resistance and high electrical conductivity, while also providing excellent resistance to corrosion, even under applied electrical potentials. Chromium oxide's mineral hardness is about 8.5 Mohs and chromium oxide has a microhardness of about 29.5 GPa or about 3000 HV.

As described herein, a base metal comprising chromium can yield a chromium oxide which may be doped to such an extent that the chromium oxide has an electrical resistance of less than 1 ohm. In some examples, the chromium oxide layer can have an electrical resistance between about $1\times10^{-4}$ $\Omega\cdot cm$ to about $1\times10^{-6}$ $\Omega\cdot cm$. Chromium oxide can also be characterized as a semiconductor, in accordance with some embodiments. A semiconductor can refer to a material having a higher resistance than a typical conductive material (such as metal), but also having less resistance than a typical insulator material. In addition, a semiconductor's conductive properties can be purposefully altered, such as by introducing impurities (i.e., doping) into the material to lower the electrical resistance of the material. For example, chromium oxide ($Cr_2O_3$) is a p-type extrinsic semiconductor. $Cr_2O_3$ has a reported literature resistivity value of about $2.2\times10^{-4}$ $\Omega\cdot cm$. In some examples, the chromium oxide can be formed by thermal oxidation or passivation oxidation of an alloy comprising chromium (e.g., stainless steel) such that the chromium oxide yields a conductive path of resistance <1 ohm.

In some examples, doping metals, such as iron, nickel, or copper, can render the chromium oxide with semiconductor characteristics. In some examples, the dopant or doping agent can be dispersed in trace amounts (i.e., low concentration) to alter the electrically conductive properties of the chromium oxide.

In addition, chromium oxide or other metal oxides based on at least one of rhenium, molybdenum, cobalt, or tantalum can be developed to provide a wide range of interference colors. In some embodiments, the term "interference colors" can refer to a range of colors, which are formed because of the thin film interference effect. The interference colors can include first order or second order interference colors such as yellow, orange, pink, purple, blue, or green hues. Surprisingly, when 316L stainless steel is oxidized to yield a chromium oxide layer having a pink or blue interference color, the chromium oxide layer can have a contact resistance of <1 ohm, corresponding to an estimated resistivity of $\sim1\times10^4$ $\Omega\cdot cm$ or less. The low electrical resistivity can be due to a combination of the extrinsic semiconductor properties of $Cr_2O_3$ being doped by other metals (e.g., Fe or Ni) with the oxide non-stoichiometry, as the $CrO_2$ phase, for example, is renowned for high electrical conductivity.

As used herein, the terms anodic film, anodized film, anodic layer, anodized layer, anodic oxidized layer, oxide film, oxidized layer, oxide layer, etc. are used interchangeably and can refer to any suitable oxide layer. The oxide layers are formed on metal surfaces of one or more metal substrates.

As described herein, the term "alloy" refers to a mixture of a metal and another element that are joined through metallic bonds. As described herein, the term "oxidation" can refer to a scenario in which a substance gains an oxygen atom, loses a hydrogen atom, or loses one or more electrons. In addition, "oxidation" can also refer to a scenario involving the loss of electrons.

Figures 1A, 1B:
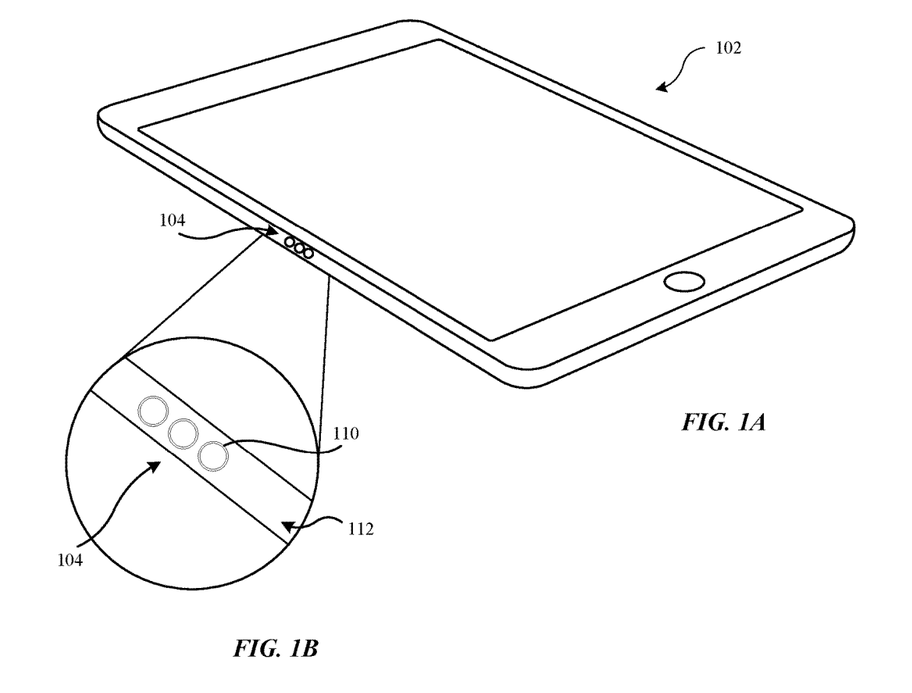
FIGS. 1A-1B illustrate a perspective view and a magnified cross sectional view of an exemplary electrical conductor component of a portable electronic device having a metal oxide layer that can be formed using the techniques described herein.

The methods described herein can be used to form durable and cosmetically appealing metallic surfaces for portable electronic devices. FIGS. 1A-1B show an exemplary electrical connector assembly that can be comprised of a material using the methods described herein. The portable electronic device shown in FIG. 1A includes a tablet computer 102 that can be made of metal or have metal sections. In some embodiments, the housing includes a base material or a metal substrate (e.g., stainless steel, stainless steel alloys, chromium alloys) or other metal alloys having chromium dispersed within the metal alloy.

In other embodiments, the housing can include an aluminum or aluminum alloy base metal. While the aluminum enclosures can be dyed to form a wide range of colors, aluminum can represent an undesirable choice as an electrical contact due to aluminum's inability to resist physical damage caused by long-term usage. Indeed, physical damage and wear to the electrical contacts can impair the conductivity properties of the electrical contacts and affect their ability to transmit/receive data and power with other electronic devices. Conversely, durable and conductive metal oxides can be developed to yield a wide range of interference colors that can substantially correspond or be identical to the wide variety of dyed aluminum enclosures available.

FIG. 1B shows a perspective view of an exemplary electrical connector assembly 104 that can be included on a peripheral portion of a housing 112 of the portable electronic device 102. The electrical connector assembly 104 can include one or more electrical contacts 110 that facilitate data and power to be transferred between the portable electronic device 102 and a peripheral device (not illustrated). In some embodiments, the one or more electrical contacts 110 can include a metal oxide layer that is disposed on a surface of the one or more electrical contacts 110 according to the techniques described herein. In one example, a plurality of electrical contacts 110 can be arranged in series along the peripheral portion of the housing 112. In one example, one or more apertures can be formed along the peripheral portion of the housing 112 during a manufacturing or machining operation of the housing 112. Each of the one or more apertures can include a size and shape that corresponds to a size and shape of the electrical contact 110 such that the electrical contact 110 can be inserted into the one or more apertures. Although the one or more electrical contacts 110 are shown in FIG. 1B as being generally circular in shape, the electrical contact 110 can have a generally rectangular, triangular, or other polygonal shape. In some embodiments, the electrical contact 110 can be aligned with a surface of the housing 112 of the portable electronic device 102. In some embodiments, the electrical contact 110 can refer to substantially an entire surface of the housing 112 of the portable electronic device 102. In some embodiments, the electrical contact 110 can be visibly displayed while on the surface of the housing 112.

Figure 2:
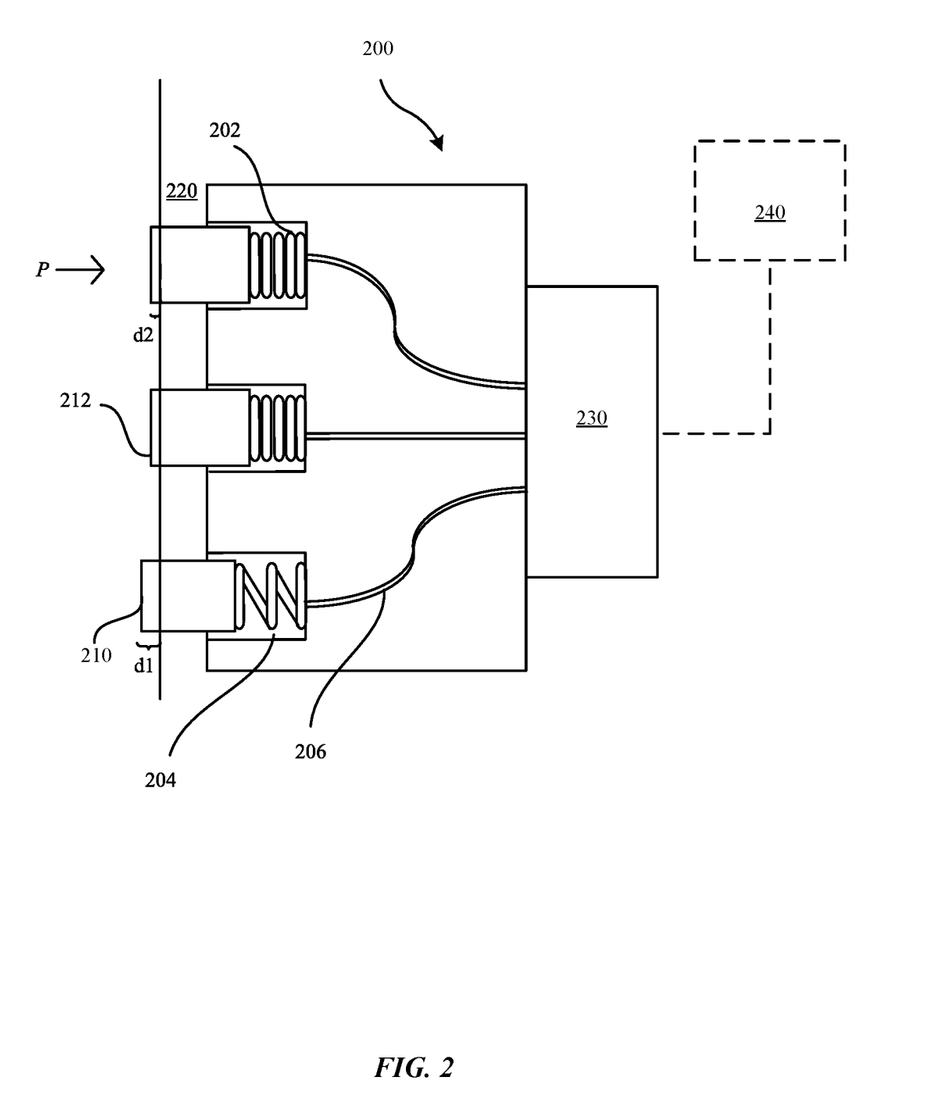
FIG. 2 illustrates a cross sectional view of an electrical conductor component having a metal oxide layer, in accordance with some embodiments.

FIG. 2 shows a perspective view of an exemplary electrical connector assembly 200 in accordance with some embodiments. The electrical connector assembly 200 can include one or more electrical contacts 212, which can be assembled in any suitable arrangement or array whose dimensions correspond to the peripheral side of the housing 220 of the portable electronic device 102. In some embodiments, each electrical contact 212 can be coupled to a spring 202 that is positioned within a receptacle 204 in order to facilitate conductivity between the electrical contact 212 and an electrical receptacle of a peripheral electronic device (not illustrated). Each electrical contact 212 can be electrically coupled to an electronic component 230 via wires 206. The electronic component 230 can refer to an integrated circuit or a transistor, switch, diode of an integrated circuit, and the like. The electronic component 230 can be configured to receive the electrical input provided by the electrical contacts 212 and provide an electrical signal to a processor 240.

The electrical contacts 212 can be configured to be biased when pressure (P) is applied against a distal end contact surface 210 of the electrical contact 212. As the electrical contact 212 is biased via the spring-loaded pin 202, the electrical contact can be configured to recede further within the receptacle 204. Moreover, increasing the amount of pressure applied to the contact surface 210 can cause the electrical contact to recede into the receptacle 204. As shown in FIG. 2, the electrical contact 212 can be configured to recede within the receptacle by a predetermined amount of distance (d2) during a biased state. In contrast, when any amount of pressure (P) is applied to the contact surface 210 the spring 202 can be in a coiled state. In contrast, a distance (d1) separates the contact surface 210 from the housing 220 during an unbiased state. During the unbiased state, the spring 202 can be in an uncoiled state. Increasing the amount of distance by which the electrical contact 212 recedes into the receptacle 204 can increase the electrical conductivity of the electrical contact 212 due, at least in part to a direct correlation between an increase in applied pressure and the measured electrical conductivity of the electrical contact 212. For example, increasing the pressure at the contact surface 210 can increase the number of metal oxide ions (e.g., chromium) of the contact surface 210 that come into contact with an electrical contact of the peripheral device (not illustrated). The increase in electrical conductivity can be measured by processor 240 based on an increase in an amplitude of an electrical signal (e.g., current) that is measured by the processor 240.

In some embodiments, the material of the electrical contact 212 (e.g., chromium oxide) can be of sufficient thickness to facilitate electrical conductivity (less than $1\times10^{-4}\Omega$ to about $1\times10^{-6}\Omega$), but also provide physically sufficient elastic deformation characteristics such that the material of the electrical contact 212 can spring back when the pressure is removed from the contact surface 210.

In some embodiments, each electrical contact 212 can have a substantially flat contact surface 210 such as to facilitate an electrical connection with a peripheral electronic device (not illustrated) without asperities. For example, in electrical contacts with a number of asperity points, friction and wear can originate at these asperity points to the extent that it can reduce the quality of the electrical connection.

In some embodiments, the contact surface 210 of the electrical contact 212 can include chromium oxide and doping metals such as gold. Gold is a relatively soft metal, having a Vickers hardness value of 30 HV-34 HV. In comparison, chromium can have a Vickers hardness value between 1,875 HV-2,000 HV. When the contact surface 210 includes chromium oxide doped with gold, such a combination can soften the contact surface 210 such that the surface 210 can be more compliant in response to applied pressure (P). Indeed, the electrical contact resistance of the material (e.g., chromium oxide) can depend upon the amount of applied pressure at the electrical contact 212, the surface area of the electrical contact 212, and the electrical resistivity of the materials that comprise the electrical contact 212.

Figure 3A:
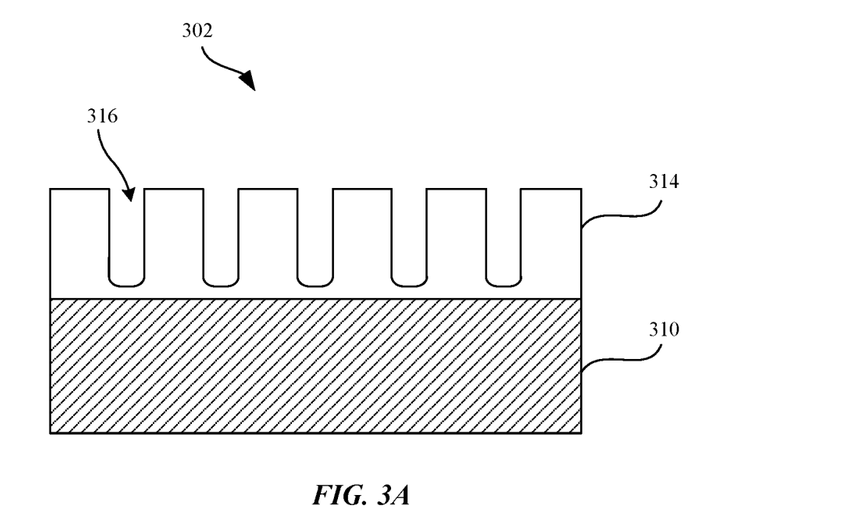
FIGS. 3A-3D illustrate cross sectional views of various metal parts having a metal oxide layer, according to some embodiments.

FIGS. 3A-3D shows cross sections of various metal parts having metal oxide layers in accordance with some embodiments. FIG. 3A shows a cross section view of a metal part 302 having a metal oxide layer 314 subsequent to an oxidation process. FIG. 3A shows that the metal part 302 can include a metal substrate 310. The metal substrate 310 can be made of any suitable types of metals. In some embodiments, the metal substrate 310 can include chromium (Cr). For example, the metal substrate can include at least 10.5 Wt % of chromium or more. In some embodiments, the metal substrate 310 can include a combination of Cr and doping metals (e.g., Cu, Au). Copper can be provided as a doping metal in instances where it may be desirable to increase the conductivity of the resulting metal oxide layer 314. In some embodiments, the Wt % of copper is less than the Wt % of chromium because increased amounts of copper can reduce the corrosion resistance of the metal part 302. In some examples, the metal substrate 310 can include between about 5 Wt % to about 10 Wt % of copper. In some examples, the metal oxide layer 314 can include at least one of rhenium, molybdenum, cobalt, or tantalum.

In some embodiments, the metal substrate 310 can have any thickness suitable for a subsequent oxidation process, whereby a portion of the metal substrate 310 can be oxidized to form a metal oxide layer 314. In some embodiments, the metal substrate 310 can have a near net shape of the metal part 302. For example, metal substrate 310 can have a shape that substantially corresponds to a shape of the housing 112 of the portable electronic device 102.

FIG. 3A shows that the metal oxide layer 314 can be formed on the metal substrate 310 or can be deposited onto the metal substrate 310. For example, the metal oxide layer 314 can be formed from the metal substrate 310 via a thermal oxidation, electrochemical oxidation process, or can be deposited onto the metal substrate 310 by a deposition process. Details as to the various techniques and systems for forming the metal oxide layer 314 will be discussed in detail below with reference to FIGS. 5-7. In some embodiments, the metal oxide layer 314 can include pores 316 that are formed as a result of the oxidation process. The metal oxide layer 314 can be metallurgically bonded to the metal substrate 310, in accordance with some embodiments. It should be noted that in some embodiments, substantially all of the metal substrate 310 is converted to a metal oxide layer 314. The thickness of the metal oxide layer 314 can vary, depending on design choice (e.g., desired interference color of the metal oxide layer 314, manufacturing limitations, desired hardness of the metal oxide layer 314, and electrical conductivity of the metal oxide layer 314). In some embodiments, the metal oxide layer 314 can have a thickness ranging between about 50 nanometers to about 250 nanometers. In some embodiments, the metal oxide layer 314 can have a thickness ranging between about 60 nm to about 140 nm. In some embodiments, the metal oxide layer 314 can be characterized as having increased hardness, increased rigidity, and increased resistance to deformation and scratches relative to the metal substrate 310.

The metal oxide layer 314 can provide a hard scratch and dent resistant coating to protect the metal part 302. In some embodiments, the metal oxide layer 314 can be dyed to impart a desired color to a surface of the metal part 302. For example, a dye or metal colorant can be infused or incorporated within pores 316 of the metal oxide layer 314. It should be noted, however, that this type of dyed coloration is different than the coloration described above, which is associated with a metal oxide layer 314 that is able to generate an interference color based on thin film interference effect and without the aid of color dyes. In some embodiments, the metal oxide layer 314 can have a substantially transparent or translucent quality. That is, metal oxide layer 314 can be at least partially transparent to visible light such that underlying metal substrate 310 can be visible through metal oxide layer 314.

In some embodiments, where the metal oxide layer 314 is a stainless steel that includes chromium, the conductivity of the metal oxide layer 314 can be affected (e.g., increasing resistivity or decreasing resistivity) by adjusting the alloying of the steel or stainless steel of the metal substrate 310. In some embodiments, the conductivity of the metal oxide layer 314 can be affected by adjusting the availability or amount of oxygen during thermal oxidation process described in more detail with reference to FIG. 6.

In some embodiments, the metal oxide layer 314 can be characterized as a non-stoichiometric compound, which can contribute to its low resistivity. In some examples, a non-stoichiometric compound can refer to a compound that includes missing atoms or ions, or includes too many atoms or ions that are packed into the lattice of the compound. Non-stoichiometric compounds can exhibit unique electrical conductivity properties due to having missing atoms or ions so as to permit other atoms, ions or electrons that carry a charge and are present in the compound to move throughout the lattice more quickly.

Figure 3B:
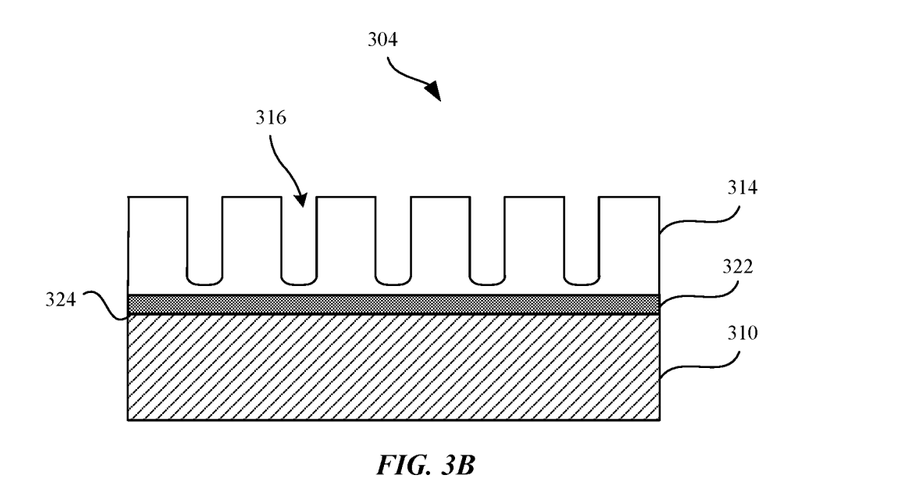

FIG. 3B shows a cross section view of a metal part 304 including a reflective layer 322 that can be included between the metal substrate 310 and the metal oxide layer 314, in accordance with some embodiments. The metal substrate 310 can include copper (Cu) particles in addition to trace amounts of chromium (Cr), in accordance with some examples. The reflective layer 322 can be deposited onto an upper surface 324 of the metal substrate 310 via a deposition technique, such as physical vapor deposition or sputtering. The reflective layer 322 can be comprised of a reflective metal, such as silver. Silver can be deposited onto the upper surface 324 of the metal substrate 310 such as to enhance the optical interference color yielded by the metal oxide layer 314. For example, if the metal oxide layer 314 is scratched or gouged such as to expose the reflective layer 322, the metal part 304 is still able to retain some of the interference coloring within the scratched portion. In some examples, the metal part 304 is able to retain some of the interference coloring in the event of a scratch in the metal oxide layer 314 because the reflective layer 322 can have an index of refraction which exceeds air ($n_{reflective\ layer} > n_{air}$).

Subsequent to the deposition of the reflective layer 322 onto the upper surface 324 of the metal substrate 310, the metal oxide layer 314 can be deposited directly onto the reflective layer 322 via a deposition process (e.g., sputtering, physical vapor deposition).

Alternatively, a second layer of readily oxidized metal can be deposited onto the reflective layer 322, where a thickness of the second layer is controlled. The second layer can be completely oxidized by a thermal or electrochemical oxidation process to yield a correspondingly controlled thickness of the metal oxide layer 314.

Figure 3C:
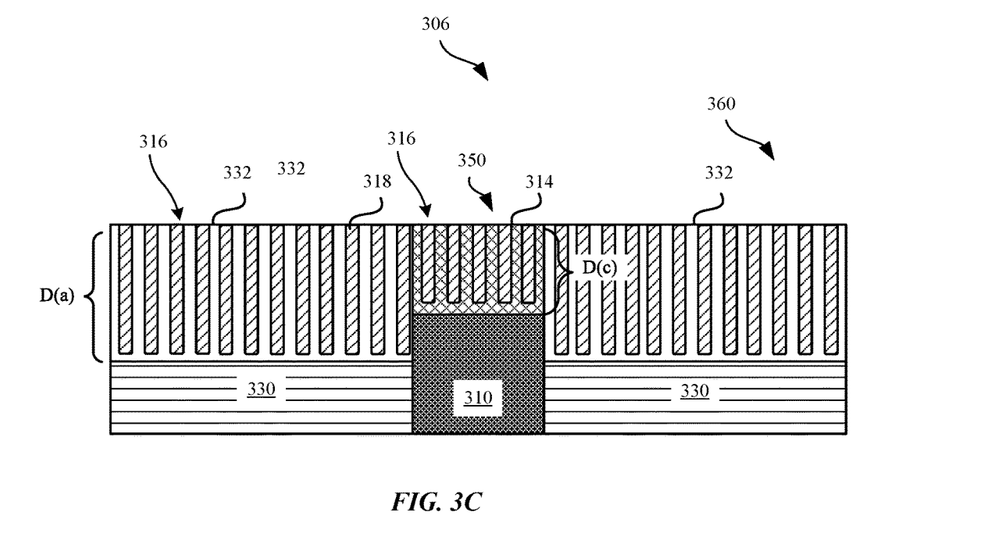

FIG. 3C shows a cross section view of a surface 306 of a device including an electrical contact 350 that is positioned adjacent to a housing 360 or enclosure of the portable electronic device 102, in accordance with some embodiments. Adjacent to one or more side(s) of the electrical contact 350 can include the housing 360 of the portable electronic device 102. The housing 360 can include a metal substrate 330 and an anodic layer 332 having pores 316 that are formed through an oxidation process. Furthermore, the pores 316 can include an anodic dye 318 having a wide range of colors such as pink, grey, black, blue, yellow, purple, or green. Accordingly, the anodic dye 318 can cause the surface of the anodic layer 332 to impart a colored appearance that corresponds to a color of the anodic dye 318.

The electrical contact 350 can include a metal substrate 310 and a metal oxide layer 314 that can be converted from a portion of the metal substrate 310, in some instances. The metal oxide layer 314 can include pores 316 that are formed through an oxidation process. In other instances, the metal oxide layer 314 can be deposited onto a surface of the metal substrate 310. The metal oxide layer 314 of the electrical contact 350 can be characterized according to a first or second order interference color (e.g., green, blue, pink, orange) having a color corresponding to a metallurgical tempering temperature of between about 300° Celsius to about 700° Celsius. Alternatively, the metal oxide layer can have a color measured according one or more L*a*b dimension values, as described in further detail with reference to FIGS. 7-8. During an oxidation or deposition process, the thickness of the metal oxide layer 314 can be intentionally adjusted such that a resulting interference color generated by the metal oxide layer 314 is substantially similar to a color of the dyed anodic layer 332 of the housing 360.

Furthermore, FIG. 3C shows that because the anodic layer 332 can be dyed to correspond to a variety of colors, the thickness D(a) of the anodic layer 332 can be immaterial to generating a desired colored appearance. However, in some embodiments, where the anodic layer 332 is anodized aluminum, the thickness of the anodic layer 332 can be of the order of 10 micrometers or more so that the anodic layer 332 can provide sufficient protection to the metal substrate 330 (e.g., aluminum). In contrast, because the thickness D(c) of the metal oxide layer 314 can be material to generating a desired color of the electrical contact 350, the metal oxide layer 314 can have a thickness D(c) that is less than D(a). In some instances, the metal oxide layer 314 can have a thickness between about 50 nm to about 250 nm. In some embodiments, the thickness of the metal oxide layer 314 can contribute to the electrical resistance of the electrical contact 350.

Figure 3D:
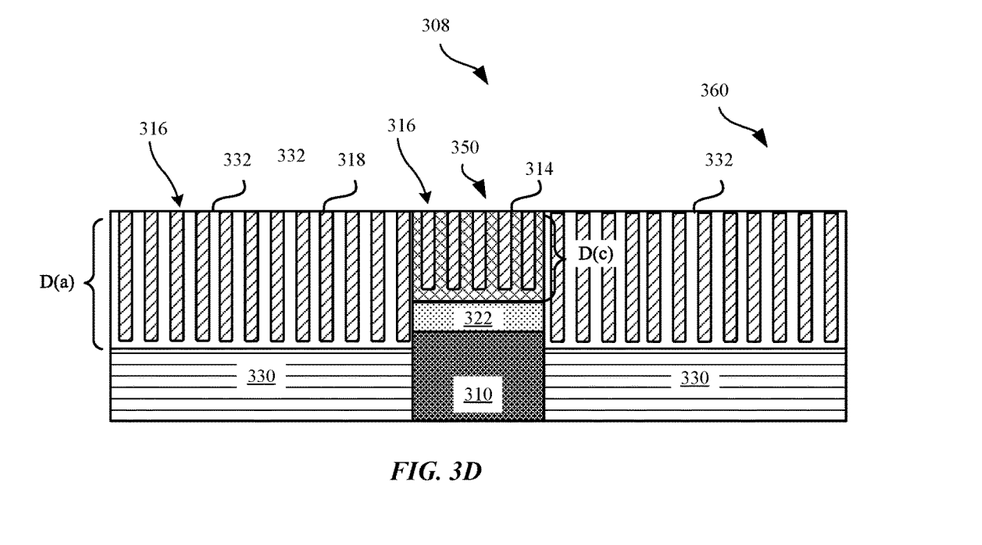

FIG. 3D shows a cross section view of a surface 308 of a device including an electrical contact 350 that is positioned adjacent to a housing 360 or enclosure of the portable electronic device 102, in accordance with some embodiments. The metal oxide layer 314 of the electrical contact 350 can be characterized according to a first or second order interference color (e.g., green, blue, pink, orange) having a color corresponding to a tempering temperature of between about 300° Celsius to about 700° Celsius. Alternatively, the metal oxide layer 314 can have a color measured according one or more L*a*b dimension values. During an oxidation or deposition process, the thickness D(c) of the metal oxide layer 314 can be intentionally adjusted such that a resulting interference color generated by the metal oxide layer 314 is substantially similar to a color of the dyed anodic layer 332 of the housing 350. Adjacent to one or more side(s) of the electrical contact 350 can include a housing 360 of the portable electronic device 102. The housing 360 can include a metal substrate 330 and an anodic layer 332 having pores 316 that are formed through an oxidation process. Furthermore, the pores 316 can include an anodic dye 318 having a wide range of colors such as pink, grey, black, blue, yellow, purple, or green. Accordingly, the anodic dye 318 can cause the surface of the anodic layer 332 to impart a colored appearance. FIG. 3D shows that because the anodic layer 332 can be dyed to correspond to a variety of colors, the thickness D(a) of the anodic layer 332 can be immaterial to generating a desired colored appearance.

FIG. 3D shows a reflective layer 322 that is positioned between the metal substrate 310 and the metal oxide layer 314. The reflective layer 322 can be comprised of a reflective metal, such as silver. Silver can be deposited onto the upper surface 324 of the metal substrate 310 such as to enhance the optical interference color yielded by the metal oxide layer 314. For example, if the metal oxide layer 314 is scratched or gouged such as to expose the reflective layer 322, the electrical contact 350 is still able to retain some of the interference coloring within the scratched portion such that a resulting interference color of the metal oxide layer 314 is substantially similar to a color of the dyed anodic layer 332 of the housing 360.

Figure 4:
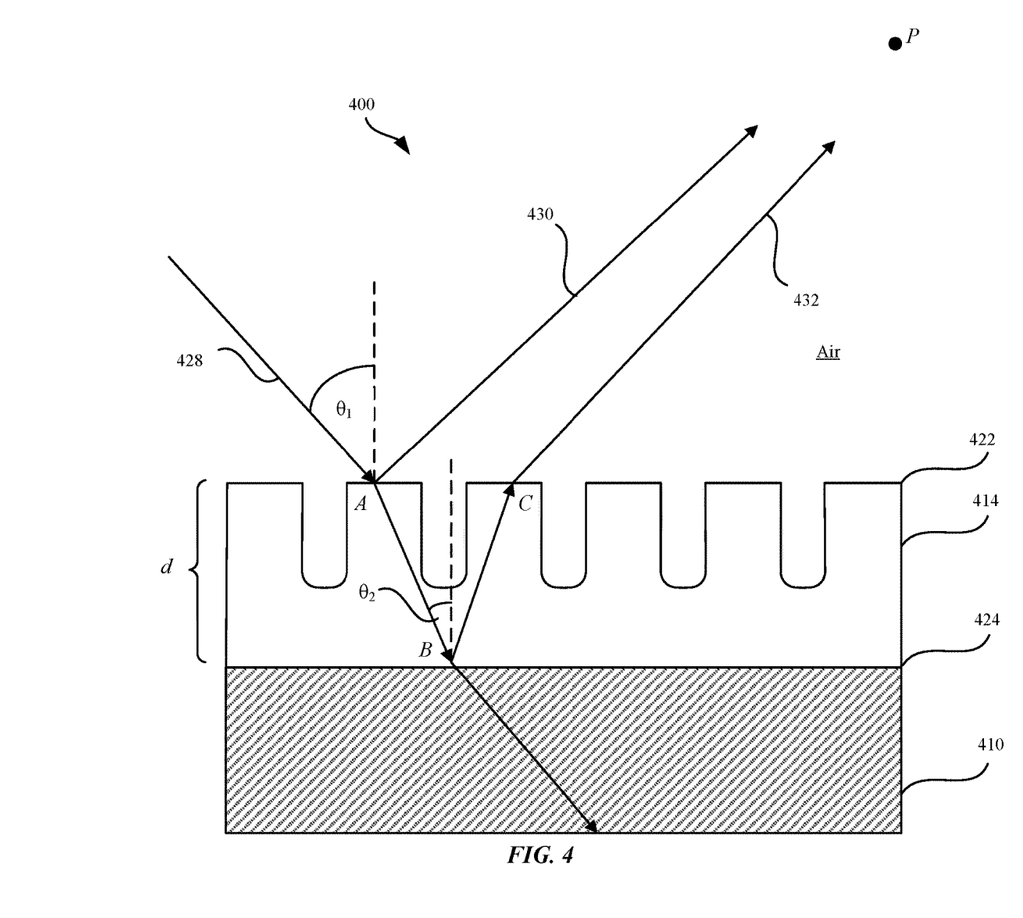
FIG. 4 illustrates a cross sectional view of a metal part having a metal oxide layer, according to some embodiments.

FIG. 4 shows a cross sectional view of a metal part 400 having a metal oxide layer 414 and a thin film interference effect. The metal oxide layer 414 that can act as a light reflecting medium in which incoming light rays 428 that are directed (e.g., incident) on the metal oxide layer 414 can be reflected by both the upper surface 422 of the metal oxide layer 414 and the bottom surface 424 of the metal oxide layer 414. In some instances, an interface is disposed between the bottom surface 424 of the metal oxide layer 414 and the metal substrate 410. In some instances, the upper surface 422 of the metal oxide layer 414 can refer to a first reflective surface and the bottom surface 424 of the metal oxide layer 414 can refer to a second reflective surface, respectively. FIG. 4 shows that some of the incoming light ray 428 (e.g., visible light wavelength) can be reflected by the upper surface 422 of the metal oxide layer 414 as reflected light ray 430. In addition, some of the incoming light ray 428 can be transmitted through the metal oxide layer 414 before being reflected at the bottom surface 424 as reflected light ray 432.

Determining the thin film interference effect on generating first and second order interference colors by the metal oxide layer 414 can be based upon several factors, including whether there is constructive interference or destructive interference of the reflected light rays 430, 432, as well as the optical path difference between the reflected light rays 430, 432.

FIG. 4 shows that light ray 428 can be directed onto the upper surface 422 of the metal oxide layer 414, which can have a refractive index of 2.551. Generally, air has a refractive index of about 1.009. As such, when the light ray is directed at an incident angle $\theta_1$ at the upper surface of the metal oxide layer 414 at point A, it can cause the light ray 428 to divide into reflected and refracted portions of light. The refracted beam of light can in turn be directed at the bottom surface 424 of the metal oxide layer 414 at angle $\theta_2$ and subsequently a portion of the light ray 428 is reflected at the bottom surface 424 of the metal oxide layer 414 at point B and then exits the metal oxide layer 414 at point C. The two reflected light rays 430, 432 will eventually converge at a common point P. Because the two light rays are traveling at different paths from point A onwards, a relative phase difference develops between these two light rays 430, 432 that can produce constructive or destructive interference at the point P in which these two light rays converge.

For example, if the upper surface 422 of the metal oxide layer 414 appears yellow, then one can infer a finding of constructive interference between the reflected light rays 430, 432 for yellow light at point P. Because a color (e.g., yellow, green, blue, pink, purple) is reflected, one can determine that there is constructive interference and utilize the aforementioned constructive interference equation to determine a thickness of the metal oxide layer. 414 For example, a 100 nm thick metal oxide layer 414 can result in an optical path difference of about 500 nm, which can correspond to a first order interference color between orange and purple (approximately corresponding to a deep pink color). In another example, a metal oxide layer 414 with a thickness between about 60 nm to about 80 nm can result in yellow and orange interference colors. In yet another example, a metal oxide layer 414 with a thickness of about 140 nm can result in a pure blue color.

In another example, if the color of the upper surface 422 of the metal oxide layer 414 appears dark (e.g., grey), one can infer a finding of destructive interference between the reflected light rays 430, 432 at point P. Moreover, based on the grey color alone, one can determine that there is destructive interference and utilize the aforementioned equation to determine a thickness of the metal oxide layer 414.

The optical path difference (A) in the film can provide an indication of constructive or destructive interference at the upper surface 422 of the metal oxide layer 414. For example, the optical path difference (A) can be determined by the formula: (AB+BC) multiplied by the refractive index of the metal oxide layer, or the equation: $\Delta=n\,(AB+BC)=n\,(2t)$. The points A, B, and C refer to the different points in FIG. 4 of the metal oxide layer 414 where light rays are reflected and these points can make up the distances AB and BC.

Figure 5:
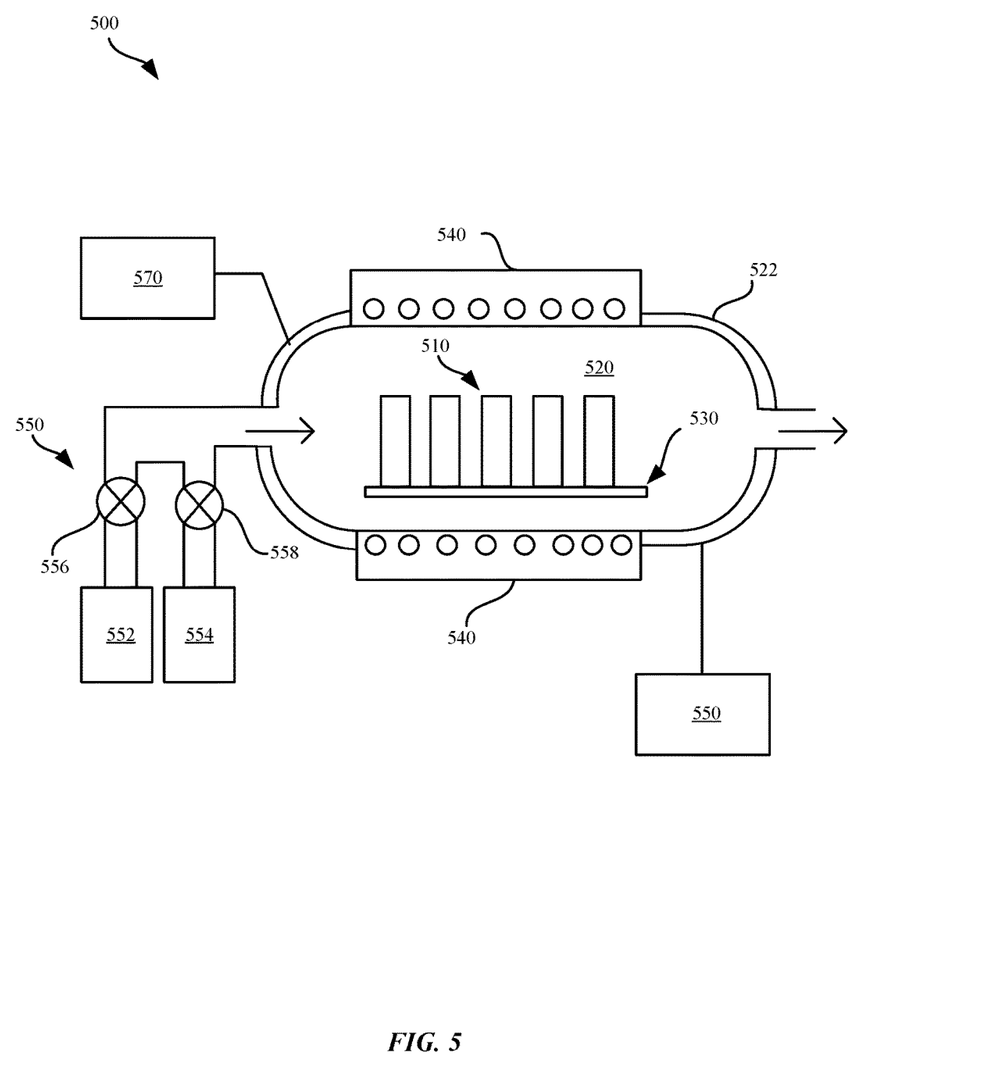
FIG. 5 illustrates a schematic view of an apparatus suitable for forming a metal oxide layer on a metal substrate, according to some embodiments.

FIG. 5 shows a schematic view of an apparatus 500 suitable for forming a metal oxide layer 314 on a metal substrate 310 according to a thermal oxidation process, in accordance with some embodiments. In some embodiments, the apparatus 500 can refer to a plasma reactor suitable for carrying out oxidation formation on the metal substrate 310. The reactor 500 can include a substrate support stand 530 for holding the metal substrate 310. The substrate support stand 530 can be positioned within a chamber 520 so the metal substrate 310 is exposed to one or more heaters 540. As shown in FIG. 5, the heaters 540 can be positioned above a top surface of the substrate support stand 530, as well as below a bottom surface of the substrate support stand 530. The heater 540 can be a single or multiple zone heater having one or more multiple heating elements. In some embodiments, the chamber 520 is suitable for generating a high temperature, between about 800° C. to about 1100° C. In addition, other hard-oxide forming metals (e.g., Re, Mo, Ca, and Ta) can be used as a basis for thermal oxidation.

The reactor 500 can further include a gas injection system 550 for introducing gas via one or more gas sources 552, 554. The first gas source 552 can be an oxygen-containing gas source, while the second gas source 554 can be a carrier gas source. In some examples, introduction of oxygen particles can be facilitated by way of a carrier gas into the chamber 520. Flow control valves 556, 558 can be respectively coupled to the first and second gas sources 552, 554 such as to selectively provide process gas or process gas mixtures to the chamber 520. During the oxidation process, oxygen ($O_2$) or hydrogen ($H_2O$) can also be introduced into the chamber 520 via the first and second gas sources 552, 554. The growth of the metal oxide layer 314 can be facilitated by the diffusion of oxygen particles into the metal substrate 310.

In accordance with some embodiments, the reactor 500 can provide low ion energy plasma via a pulsed or continuous wave RE power generator 570. The reactor 500 can include a chamber 520 having a cylindrical side wall 522. The chamber 520 can be coupled to a RF power generator 570 to deliver RE hydrogen plasma into the reactor 500.

The thickness of the metal oxide layer 314 that is formed in the reactor can depend upon a number of factors, including the composition of the metal substrate 310, the alloying of the steel, and adjusting the amount of oxygen available during the thermal oxidation process. For example, stainless steel oxidizes more slowly than mild steel (e.g., mild steel includes less chromium than stainless steel). In addition, time, temperature, and the environment of the oxidation process can also control the formation of the metal oxide layer 314. For example, the chromium content included within 304 stainless steel can inhibit oxide growth relative to carbon steel/mild steel and requires a longer exposure time such that an increased thermal oxidation temperature of the metal is required to achieve an equivalent color. Once the temperature of the metal oxide layer 314 having chromium content exceeds about 370° C. and about 600° C., an increase in oxide thickness tends to attenuate the reflection of the metal oxide layer 314 to such a degree that the interference coloring effect becomes weaker and generated colors are more muted.

In some embodiments, the metal oxide layer 314 can also be formed by physical vapor deposition, electrochemical oxidation, and the like.

Figure 6:
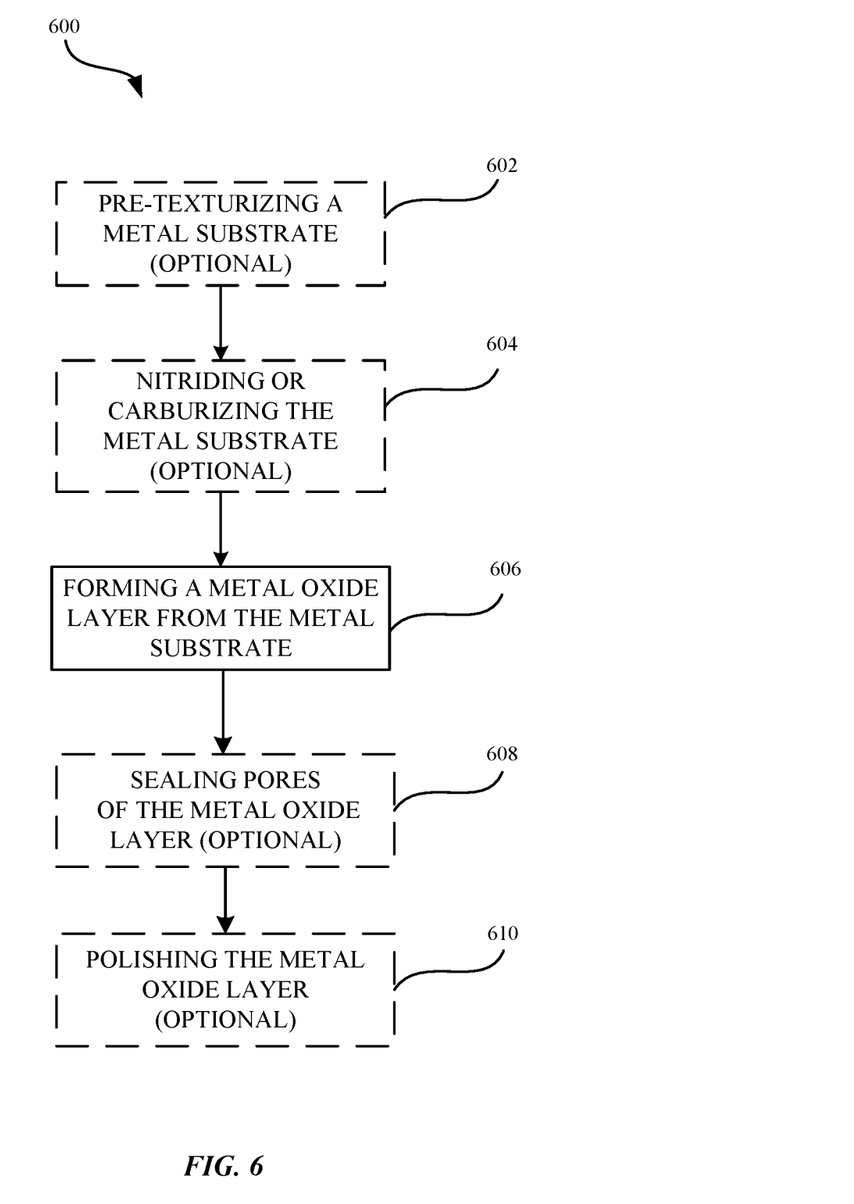
FIG. 6 illustrates a flowchart indicating a process for forming a metal oxide layer, according to some embodiments.

FIG. 6 illustrates an oxidation process 600 for forming a metal part having a metal oxide layer 314 according to some embodiments. As shown in FIG. 6, the method 600 can begin at step 602, where a surface pretreatment (or pre-texturizing) is optionally performed on the metal substrate 310. The surface treatment can be a polishing process that creates a mirror polished surface on the metal substrate 310, corresponding to a substantially uniform surface profile. In other embodiments, the surface treatment is an etching process that creates a textured surface that can have a matte appearance. In other embodiments, creating a textured surface can be the result of at least one of blasting, etching, or chemically polishing the surface of the metal substrate 310. Suitable etching processes include an alkaline etch, where the metal substrate 310 is exposed to an alkaline solution (e.g., NaOH) for a predetermined time period for creating a desired texture. Acidic etching solutions (e.g., $NH_4HF_2$) can also be used. Polishing techniques can include chemical polishing, which involves exposing the metal substrate 310 to acidic solution, e.g., sulfuric acid, phosphoric acid, and the like. In some embodiments, the polishing techniques includes one or more mechanical polishing processes. In some embodiments, the metal substrate 310 can be textured or roughened to impart a dull finish to the surface of the metal substrate 310. In some embodiments, a textured or roughened surface can be performed for the purpose of rendering a dull color appearance in a metal oxide layer 314 formed from the metal substrate 310. In some embodiments, where a shiny or bright color appearance to the metal oxide layer 314 is desired, the metal substrate 310 can be polished rather than etched in order to create an underlying light reflective surface. In other embodiments, where a dark color or shade is desired, the metal substrate 310 can be etched in order to purposely create an underlying light trap that traps incoming light. In some embodiments, the textured surface of the metal substrate 310 can also control the structure of the metal oxide layer 314 that is formed.

A step 604, a nitriding or carburizing operation can be optionally performed on a surface of the metal substrate 310 prior to the oxidation step (see step 606). In some examples, nitriding or carburizing the surface of the metal substrate can result in enhancing the hue of the resulting interference color generated by the metal oxide layer without affecting the electrical conductivity of the surface of the metal oxide layer 314. In some embodiments, the nitriding process can involve heating steel or stainless steel in the presence of ammonia or other nitrogen-rich material such as to increase the hardness and corrosion resistance of the resulting oxide layer. In some embodiments, carburizing process can refer to adding carbon, via a heating process, in order to harden the resulting metal oxide layer 314. Other examples of processes for hardening the resulting metal oxide layer 314 to induce a color change can include carbonitriding, nitrocarburizing, boriding, or any combination thereof. Details as to techniques and methods that may be suitable for nitriding or carburizing the surface of the metal substrate are described in U.S. patent application Ser. No. 14/965,716, hereby incorporated by reference in its entirety for all purposes.

At step 606, an oxidization step is performed on the metal substrate 310. During the oxidation process, a metal oxide layer 314 having a number of pores formed longitudinally throughout the metal oxide layer 314. In some embodiments, the metal substrate 310 can be oxidized via a thermal oxidation process, as described in detail with reference to FIG. 5. In some embodiments, oxidization of the metal substrate 310 can be performed through electrochemical oxidation process. During the oxidation process, a metal oxide layer 314 having a porous portion and a non-porous barrier portion can be formed.

In some embodiments, the thickness of the metal oxide layer 314 can be controlled via a plurality of factors, such as the duration of time in which the metal substrate 310 is exposed to the oxidation process. In other words, the longer the time in which the metal substrate 310 is exposed to the oxidation process, the thicker the formation of the metal oxide layer 314.

At step 608, the pores of the porous metal oxide layer 314 can be optionally sealed via a sealing process according to some embodiments. In some instances, sealing the pores may be preferable in that sealing closes the pores such that any oxidized fragments of either the fragmented portion or the fissured portion are retained within the porous metal oxide layer 314. In some instances, the sealant can settle towards the bottom portion of the pore walls of the porous metal oxide layer. The sealant may trap displaced oxidized materials of the porous metal oxide layer 314 between the sealant and the bottom portion of the pores. This seating process hydrates the metal oxide material of the pore walls, thereby increasing the structural integrity of the metal oxide layer 314.

At step 610, a further surface treatment can be optionally applied to the metal oxide layer 314 to further adjust surface finish and cosmetics. For example, a polishing or buffing operation gives the surface of the metal oxide layer 314 a uniform and shiny appearance.

Figure 7:
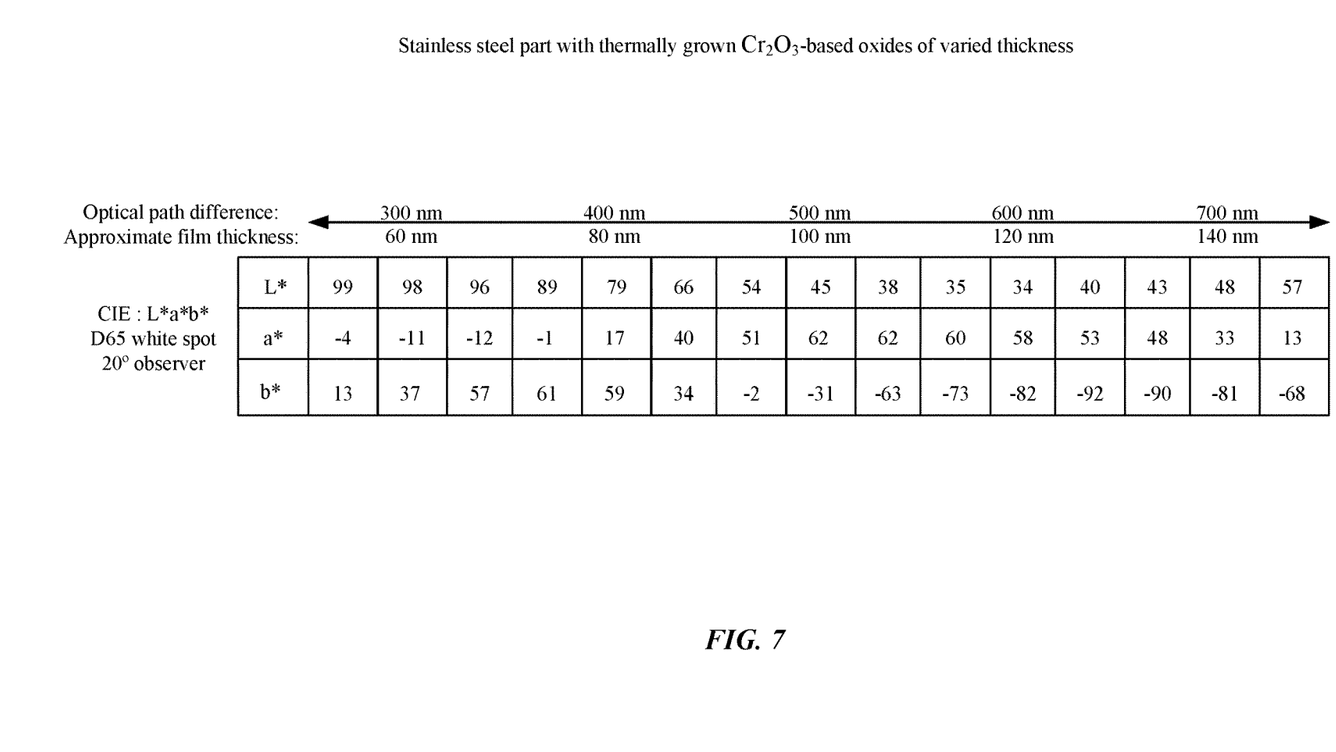
FIG. 7 illustrates a graph showing a relationship of L*a*b* color dimension values as a function of chromium oxide layer thickness and optical path difference.

FIG. 7 shows a graph indicating the relationship between L*a.*b* color-opponent dimension values as a result of chromium oxide layer thickness and optical path difference of the chromium oxide layer in samples of metal parts having a chromium oxide layer. Sample L*a*b* color-opponent dimension values were taken under CIE Standard Illuminant D65 conditions. D65 has a correlated color temperature of about 6500 Kelvins and corresponds to daylight. In some examples, any light source which has substantially the same spectral power distribution as the average midday light conditions can be also considered a D65 light source. FIG. 7 further shows that tests were conducted under D65 light conditions with a 20° observer's field of view. The 20° observer can refer to a 20° arc inside the fovea where color-sensitive cones reside in the human eye.

FIG. 7 shows L* color-opponent dimension values for samples of metal parts having a chromium oxide layer. The L* color opponent dimension value is one variable in an L*a*b* color space. In general, L* corresponds to an amount of lightness. L*=0 represents the darkest black while L*=100 represents white. In general, a* indicates amounts of red color and green color in a sample. A negative a* value indicates a green color, while a positive a* value indicates a red color. Accordingly, samples having a positive a* value will indicate that more red than green is present. In general, b* indicates amounts of blue color and yellow color in a sample. A negative b* value indicates a blue color, while a positive b* value indicates yellow color. Accordingly, samples having a positive b* value will indicate more yellow than blue is present.

As shown in FIG. 7, various samples of the chromium oxide alloy layer were tested for L*a*b* dimension color values. The samples had a chromium oxide layer between about 60 nm to about 140 nm. FIG. 7 shows the effects of the relationship between approximate chromium oxide layer thickness and optical path difference. In one example, one sample had a chromium oxide layer thickness of about 60 nm and a corresponding optical path difference of about 300 nm. In turn, the chromium oxide layer of the sample had a color dimension values of L*=98, a*=−11, and b*=37. In another example, one sample had a chromium oxide layer thickness of about 80 nm and a corresponding optical path difference of about 400 nm. In turn, the chromium oxide layer of the sample had a color dimension values of L*=79, a*=17, and b*=59. In another example, one sample had a chromium oxide layer thickness of about 100 nm and a corresponding optical path difference of about 500 nm. In turn, the chromium oxide layer of the sample had a color dimension values of L*=45, a*=62, and b*=−31. In yet another example, one sample had a chromium oxide layer thickness of about 120 nm and a corresponding optical path difference of about 600 nm. In turn, the chromium oxide layer had color dimension values of L*=34, a*=58, and b*=−82. These samples generally show a relationship between chromium oxide layer thickness and L*a*b values. In other words, with increased chromium oxide layer thickness, there is a corresponding decrease in L* value and decrease in b* value. Moreover, where the chromium oxide layer has a thickness between about 60 nm to about 120 nm, the samples showed increasingly negative b* values (i.e., more blue). Furthermore, where the chromium oxide layer has a thickness between about 60 nm to about 100 nm, the samples showed increasingly positive a* values (i.e., more red). However, when the chromium oxide layer had a thickness greater than about 100 nm, the samples began to show diminished a* values (i.e., more green). However, it should be noted that when the chromium oxide layer's thickness is increased beyond about 250 nm, the interference color of the chromium oxide layer can become more dull, muted, and resemble darker colors (e.g., grey) because increased thickness of the chromium oxide layer can result in attenuation of light reflection.

In addition, some trace particles can be added to the metal substrate 310 such as to increase the abrasion resistance or electrical conductivity of the resulting chromium oxide layer. For example, the inclusion of trace particles with well-known electrically conductive properties such as copper and gold may increase electrical conductivity, while also causing the chromium oxide layer to exhibit a reduction in interference color. Accordingly, some alloying elements can have a deleterious effect on the color and appearance of the chromium oxide layer.

Figure 8A:
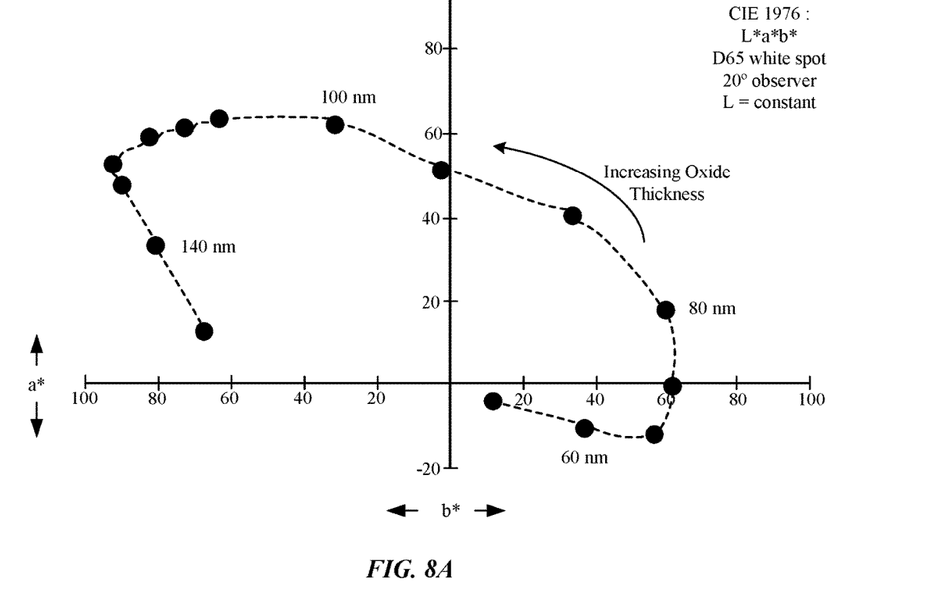
FIGS. 8A-8B illustrate a chromaticity graph and a table showing a relationship of L*a*b* color dimension values as a function of chromium oxide layer thickness.
Figure 8B:
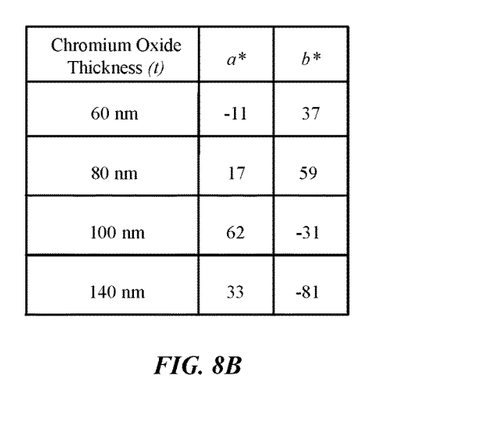

FIGS. 8A-8B illustrate a chromaticity graph and a table indicating a relationship between CIE 1976 L*a*b* color-opponent dimension values as a result of chromium oxide layer ($Cr_2O_3$) thickness (t) in samples of metal parts. FIG. 8A shows that tests were conducted under D65 light conditions with a 20° observer's field of view. The 20° observer can refer to a 20° arc inside the fovea where color-sensitive cones reside in the human eye. FIG. 8A shows the dimension L for luminance is held constant, while a* and b* color-opponent dimension values vary as a function of chromium oxide thickness (t). FIG. 8A shows that an increase in the chromium oxide layer thickness (t) of the samples of metal parts is associated with an increasingly negative b* value (i.e., more blue). Furthermore, these samples of metal parts generally show that an increase in the chromium oxide layer thickness (t) of the metal part between about 60 nm to about 100 nm is associated with an increasingly positive a* value (i.e., more red). However, the sample having a chromium oxide layer with a thickness (t) of 140 nm exhibited a diminished a* value (i.e., more green).

FIG. 8B shows a table of samples of metal parts having a chromium oxide layer thickness (t) of 60 nm, 80 nm, 100 nm, and 140 nm as shown in the chromaticity graph of FIG. 8A. In one example, a metal part having a chromium oxide layer thickness (t) of 60 nm was measured to have an a* value of −11 and a b* value of 37. In another example, a metal part having a chromium oxide layer thickness (t) of 80 nm was measured to have an a* value of 17 and a b* value of 59. In another example, a metal part having a chromium oxide layer thickness (t) of 100 nm was measured to have an a* value of 62 and a b* value of −31. In another example, a metal part having a chromium oxide layer thickness (t) of 140 nm was measured to have an a* value of 33 and a b* value of −81.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. An electronic device, comprising:
   a housing that is characterized by a color; and
   an electrical contact having an upper surface that is visible at an exterior surface of the housing, wherein the electrical contact comprises a metal substrate and an electrically conductive metal oxide that corresponds to the color of the housing corresponding to an optical path difference between the upper surface and an interface between the electrically conductive metal oxide and the metal substrate.

2. The electronic device of claim 1, wherein the electrically conductive metal oxide includes $Cr_2O_3$.

3. The electronic device of claim 1, wherein the metal substrate includes at least one of chromium, rhenium, molybdenum, cobalt, or tantalum.

4. The electronic device of claim 1, wherein the optical path difference is between about 300 nm to about 1000 nm.

5. The electronic device of claim 1, wherein the electrical contact is characterized as having an electrical resistance of less than 1 ohm.

6. The electronic device of claim 1, wherein the electrical contact is included in an electrical connector assembly that is electrically coupled to an integrated circuit that is included within the housing.

7. The electronic device of claim 6, wherein the electrical contact is coupled to a spring engagement member in the electrical connector assembly that is configured to increase electrical signal conductivity in response to a pressure being applied to a surface of the electrical contact.

8. A method for forming an electrically conductive metal oxide for a component of a portable electronic device, the portable electronic device having an enclosure that is characterized by a color and is capable of carrying the component having a metal substrate, the method comprising:
   forming the electrically conductive metal oxide on the metal substrate, wherein the electrically conductive metal oxide includes a first reflective surface that corresponds to an upper surface of the electrically conductive metal oxide and a second reflective surface that corresponds to an interface of the metal substrate and the electrically conductive metal oxide, wherein the electrically conductive metal oxide is characterized as having an optical path difference between the first and the second reflective surfaces that corresponds to the color of the enclosure.

9. The method of claim 8, wherein the electrically conductive metal oxide is formed on the metal substrate by at least one of sputter deposition, physical vapor deposition, or chemical vapor deposition.

10. The method of claim 8, wherein the electrically conductive metal oxide is formed on the metal substrate by at least one of spontaneous oxidation, thermal oxidation, or electrochemical oxidation.

11. The method of claim 8, wherein the component is proud with respect to an exterior surface of the enclosure.

12. The method of claim 8, wherein the optical path difference is between about 300 nm to about 1000 nm.

13. The method of claim 8, wherein the component is flush with an exterior surface of the enclosure.

14. A protective coating of an electrical contact, the protective coating comprising:
   an electrically conductive metal oxide layer formed on the electrical contact, the electrical contact comprising a metal substrate having an upper surface, wherein the electrically conductive metal oxide layer corresponds to a pre-determined color corresponding to an optical path difference between the upper surface and an interface between the electrically conductive metal oxide layer and the metal substrate.

15. The protective coating of claim 14, further comprising a reflective layer at the interface.

16. The protective coating of claim 14, wherein the metal substrate includes at least one of chromium, rhenium, molybdenum, cobalt, or tantalum.

17. The protective coating of claim 14, wherein the metal substrate includes at least about 10.5 Wt % of chromium.

18. The protective coating of claim 14, wherein the metal substrate is coupled to a housing of a device and the pre-determined color of the electrically conductive metal oxide layer corresponds to a color of the housing of the device.

19. The protective coating of claim 14, wherein the optical path difference is between about 300 nm to about 1000 nm.

20. The protective coating of claim 14, wherein the electrically conductive metal oxide layer has a resistance of less than 1 ohm.

21. A protective coating of a metal substrate, the protective coating comprising:
  an electrically conductive metal oxide layer formed on the a metal substrate and having an upper surface, wherein the electrically conductive metal oxide layer corresponds to a pre-determined color corresponding to an optical path difference between the upper surface and a reflective interface layer between the electrically conductive metal oxide layer and the metal substrate.

\* \* \* \* \*